United States Patent Office 2,809,173
Patented Oct. 8, 1957

2,809,173
MANUFACTURE OF FOAMED LATEX SPONGE CONTAINING GLASS FIBERS

Paul Dereniuk, North Smithfield, R. I., assignor to United States Rubber Company, New York, N. Y., a corporation of New Jersey No Drawing. Application April 21, 1953,
Serial No. 350,255

8 Claims. (Cl. 260—2.5)

This invention relates to the manufacture of foamed latex sponge reinforced with glass fibers.

It is well known that sponge rubber articles may be made by forming a natural or synthetic rubber latex froth or foam containing compounding materials such as foaming agents, vulcanizing ingredients, accelerators, stabilizers, fillers, gelling agents, and the like, shaping the foam as by pouring it into molds, allowing the foam to gel by permitting it to rest at room temperature or accelerating the rate of gelling by heat, and vulcanizing at elevated temperature. It is known that the incorporation of glass fibers in the sponge improves its compression resistance. As shown in U. S. Patent 2,498,785, the dry glass fibers are sifted into the latex gradually during the whipping operation. The continuation of the whipping operation is necessary to uniformly distribute the glass fibers throughout the foam structure. In commercial sponge production, it is not feasible to take the time and to provide the necessary extra equipment to add compounding ingredients or glass fibers to the latex in the beater while the latex is being frothed. Further, such addition of the fibers during frothing limits the operation to a batch process in commercial whippers. In commercial batch and continuous foam processes, the compounding ingredients are added to the latex before or after the frothing operation as aqueous solutions in the case of water-soluble compounding ingredients, or in the case of water-insoluble compounding ingredients, as aqueous dispersions or pastes usually with the aid of anionic surface-active agents. Such anionic surface-active agents are compatible with the anionic surface-active agents that are present in the latex. Generally, stabilizers, vulcanizing ingredients, and foaming agents are compounded into the latex in a mixing apparatus before whipping to a foam, and gelling agents are mixed into the completely whipped foam in a so-called sensitizing apparatus prior to pouring into molds or otherwise shaping the foam. When glass fibers were slurried in water, or in water containing anionic surface-active agents similarly to conventional compounding ingredients, for addition to the latex, the glass fibers agglomerated into small lumps or nodules. When such fiber slurries containing these agglomerates were mixed with the latex before foaming as in conventional latex compounding practice, the nodules would not break up and the fibers would not disperse in the latex. When whipped into a foam in the various types of commercial frothing machines, the fibers did not become dispersed in the latex but instead the fiber agglomerates settled out very rapidly, and a uniform sponge could not be made in this manner. Similarly, such a glass fiber slurry containing the agglomerates when mixed with the whipped froth gave a non-uniform sponge containing the glass fiber nodules.

According to the present invention, I have now found that if the glass fibers are slurried in water with a cationic surface-active agent, a uniform dispersion of discrete glass fibers results and this slurry may readily be mixed with the liquid latex before foaming, or with the frothed latex, to give a final sponge rubber product in which the individual glass fibers are uniformly dispersed without agglomeration or nodulation.

In carrying out the present invention, the glass fibers previously slurried in water with a cationic surface-active agent are mixed with the latex containing a conventional soap (alkali salt of a soap-forming monocarboxylic acid) or other anionic surface-active foaming agent before or after whipping the latex into a foam of the desired density; a gelling agent such as 0.5 to 4 parts of sodium silicofluoride per 100 parts of rubber of the latex is usually mixed into the foam; the foam is shaped as by pouring in molds; the shaped foam is permitted to gel; and the gelled foam is vulcanized to sponge rubber.

The latex for preparing sponge rubber according to the present invention may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes-1,3, for example, butadiene-1,3, 2-methyl-butadiene-1,3 (isoprene), 2-chloro-butadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The latex as prepared for foaming will contain 0.5 to 10 parts and preferably 1 to 6 parts, based on 100 parts of rubber of the latex, of soap or other anionic surface-active agent, which may be added as such in the case of natural rubber latex, or which may include anionic surface-active agents from dispersions of added conventional compounding ingredients, or which may at least in part be the residual emulsifying agent from the emulsion polymerization in the case of a synthetic latex. Such soaps, or other anionic surface-active agents, are those having a general formula selected from the group consisting of $R-COOM$, $R-SO_3M$, and $R-OSO_3M$, where M represents alkali-metal, ammonium or substituted ammonium (amine) radical, and R represents an organic radical containing at least one group having more than 8 (to 24) carbon atoms. Examples of such anionic surface-active agents are:

(1) Soaps (e. g. sodium laurate, ammonium stearate, diethanol-ammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g. $C_{17}H_{33}-O-C_2H_4-SO_3-Na$).

(5) Sulfated ethers of long and short chain aliphatic groups (e. g. $C_{17}H_{33}-O-C_2H_4-O-SO_3Na$).

(6) Sulfonated alkyl esters of long chain fatty acids

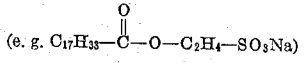

(7) Sulfonated glycol esters of long chain fatty acids

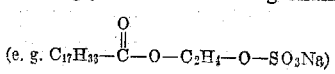

(8) Sulfonated alkyl substituted amides of long chain fatty acids

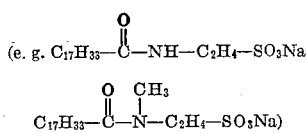

(9) Alkylated aryl sulfonates (e. g. isopropyl naphthalene sodium sulfonate, dodecyl benzene sodium sulfonate).

(10) Hydroaromatic sulfonates (e. g. tetrahydronaphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

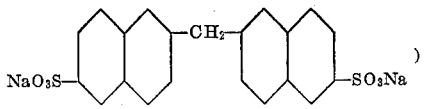

The glass fibers, which may be used, are commercially available and are made from Pyrex type sodium-boron glass, drawn to a diameter in the range of 0.0002 to 0.0007 inch and hammer-milled to various lengths from $\frac{1}{32}$ inch to $\frac{1}{2}$ inch. The preferred fibers are about 0.00038 inch average diameter and about $\frac{1}{8}$ inch average length. According to the present invention, the glass fibers are slurried in water with 0.2 to 10 parts of cationic surface-active agent per 100 parts of the glass fibers. The amount of glass fibers may be from 1 to 20 parts, and is preferably 2 to 6 parts, based on 100 parts of rubber of the latex. It could not possibly be foreseen that the mixing of the glass fiber slurry with a latex containing an amount of anionic surface-active agent in excess of the cationic surface-active agent in the glass fiber slurry which neutralizes the cationic surface-active agent and results in an anionic dispersion after mixing would maintain the glass fibers uniformly and completely dispersed in the latex, whereas in mixing of anionic latices with aqueous slurries of the glass fibers without any surface-active agent and glass fiber slurries containing anionic surface-active agent, the glass fibers agglomerated and the agglomerates were retained to the finished sponge to give a non-uniform product.

Any conventional cationic surface-active agents may be used for preparing the slurry of glass fibers. Examples of such cationic surface-active agents are:

(1) Quaternary ammonium salts in which one of the radicals attached to the nitrogen has an organic group having at least 8 (to 24) carbon atoms (e. g. trimethyl octadecyl ammonium chloride, dimethyl hexadecyl octadecyl ammonium chloride, lauryl pyridinium chloride, cetyl dimethyl benzyl ammonium chloride, N-stearyl betaine).

(2) Amines, amides and diamines having an organic group containing at least 8 (to 24) carbon atoms and their acid salts (e. g. octadecylamine acetate, hexadecyl di-(polyoxyethylene) amine, oleyl diethylethylenediamine).

While the concentration of the glass fibers in the aqueous suspension is not critical, from a practical standpoint it should be as high as possible without making the slurry so thick that it cannot readily be uniformly mixed with the latex since it is desirable to maintain the latex compound in the foam as concentrated as possible to minimize shrinking of the final sponge. The concentration of glass fibers in the aqueous slurry may be in the range of 20% to 60%. I have found that the further incorporation in the glass fiber slurry of a non-ionic surface-active agent in addition to the cationic surface-active agent will decrease the viscosity of the slurry and facilitate its mixing with the latex. The non-ionic surface-active agent does not prevent agglomeration of the glass fibers in the aqueous slurry as does the cationic surface-active agent, but it reduces the viscosity at a given concentration of glass fibers in the slurry, making the slurry of a given concentration easier to be uniformly mixed with the latex or the foam, or permitting a higher concentration of fibers in a slurry of a given viscosity. The amount of such optional non-ionic surface-active agent when used may be from 0.1 to 10 parts per 100 parts of glass fibers. Such non-ionic surface-active agents that may be optionally used in preparing the aqueous slurry of glass fibers are:

(1) Monoethers of polyglycols with long chain fatty alcohols, such as reaction products of ethylene oxide or polyethylene glycol with a long-chain fatty alcohol (e. g. reaction product of ethylene oxide and oleyl alcohol, viz: $C_{18}H_{35}—(OC_2H_4)_nOH$, where $n$ is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

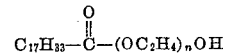

where $n$ is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

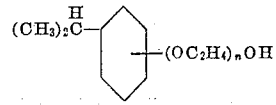

where $n$ is 10 to 20).

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether or sorbitol, or so-called polyoxyethylene sorbitol hexaoleate).

The following illustrates the invention. All parts and percentages referred to in this patent specification are by weight.

A natural rubber latex was compounded by mixing into 159 parts of the latex (100 parts dry rubber) 2 parts of sulfur as a 60% aqueous dispersion, 1.25 parts of the zinc salt of mercaptobenzothiazole as a 30% aqueous dispersion paste, 1 part of antioxidant as a 50% aqueous dispersion paste, 1.5 parts of potassium oleate as a 20% aqueous solution, and 1 part of triethyl trimethylene triamine as a 50% aqueous solution. The dispersion pastes were prepared with small amounts of conventional anionic surface-active dispersing agent. An aqueous slurry of glass fibers of about $\frac{1}{8}$ inch average length and about 0.00038 inch average diameter was prepared by stirring 33 parts of the sifted glass fibers into 65 parts of water containing 0.5 part of the acetate salt of a mixture of primary long chain aliphatic (6% hexadecyl, 93% octadecyl and 1% octadecenyl) amines which is a cationic surface-active agent, and containing 0.66 part of polyethylene glycol monoisooctyl phenyl ether (reaction product of ethylene oxide and isooctyl phenol) which is a non-ionic surface-active agent. Ten parts of this glass fiber slurry was homogeneously mixed with the latex compounded as above, after which there was added to the mixture 5 parts, on a dry basis, of a 45% aqueous dispersion paste of zinc oxide containing a small amount of anionic surface-active agent, and 1 part, on a dry weight basis, of a 45% aqueous dispersion paste of zinc diethyl dithiocarbamate containing a small amount of anionic surface-active agent. Air was beaten into the thus prepared latex compounded with conventional compounding ingredients and with the glass fibers treated with the cationic surface-active agent in a conventional whipping apparatus until the foam produced acquired the desired density; 2 parts, on a dry weight basis, of a 25% aqueous paste of sodium silicofluoride gelling agent was mixed into the foam; the foam was poured into molds, permitted to gel at room temperature, and then vulcanized at 212° F. The product was a uniform sponge rubber free from agglomerates of the glass fibers.

In a variation of the above method, the latex compounded as above without the glass fibers was continously passed through a conventional beater where the latex was whipped into a foam of the desired density and fed continuously into a sensitizing tub where sodium silicofluoride gelling agent and the aqueous slurry of glass fibers prepared as above was continuously mixed into the foam in amounts to maintain the above ratios of 3.3 parts of glass fibers and 2 parts of sodium silicofluoride per 100 parts of rubber of the latex. The thus prepared foam was drawn into molds from the sensitizing tub, permitted to gel at room temperature, and vulcanized at 212° F. The product again was a uniform sponge rubber free from agglomerates of the glass fibers.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making foamed latex sponge which comprises forming into a foam a rubber latex containing 0.5 to 10 parts of anionic surface-active agent per 100 parts of rubber of the latex and an aqueous slurry of uniformly dispersed discrete glass fibers having a length from $\frac{1}{32}$ inch to $\frac{1}{2}$ inch, said slurry containing 0.2 to 10 parts of cationic surface-active agent per 100 parts of glass fibers, the amount of glass fibers being 1 to 20 parts per 100 parts of rubber of the latex, the amount of anionic surface-active agent in the latex being in excess of the cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

2. The method of making foamed latex sponge which comprises forming into a foam a rubber latex containing 0.5 to 10 parts of anionic surface-active agent per 100 parts of rubber of the latex and an aqueous slurry of uniformly dispersed discrete glass fibers having a length from $\frac{1}{32}$ inch to $\frac{1}{2}$ inch, said slurry containing 0.2 to 10 parts of cationic surface-active agent and 0.1 to 10 parts of non-ionic surface-active agent per 100 parts of glass fibers, the amount of glass fibers being 1 to 20 parts per 100 parts of rubber of the latex, the amount of anionic surface-active agent in the latex being in excess of the cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, said cationic surface-active agent being selected from the group consisting of (1) quarternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

3. The method of making foamed latex sponge which comprises preparing a mixture of a rubber latex containing 0.5 to 10 parts of anionic surface-active agent per 100 parts of rubber of the latex and an aqueous slurry of uniformly dispersed discrete glass fibers having a length from $\frac{1}{32}$ inch to $\frac{1}{2}$ inch, said slurry containing 0.2 to 10 parts of cationic surface-active agent per 100 parts of said glass fibers, the amount of glass fibers being 1 to 20 parts per 100 parts of rubber of the latex, the amount of anionic surface-active agent in the latex being in excess of the cationic surface-active agent in the glass fiber slurry whereby the mixture of the latex and glass fiber slurry is an anionic dispersion, whipping the mixture to a foam, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

4. The method of making foamed latex sponge which comprises preparing a mixture of a rubber latex containing 0.5 to 10 parts of anionic surface-active agent per 100 parts of rubber of the latex and an aqueous slurry of uniformly dispersed discrete glass fibers having a length from $\frac{1}{32}$ inch to $\frac{1}{2}$ inch, said slurry containing 0.2 to 10 parts of cationic surface-active agent and 0.1 to 10 parts of non-ionic surface-active agent per 100 parts of glass fibers, the amount of said glass fibers in the mixture being 1 to 20 parts per 100 parts of rubber of the latex, the amount of anionic surface-active agent in the latex being in excess of the cationic surface-active agent in the glass fiber slurry whereby the mixture of the latex and glass fiber slurry is an anionic dispersion, whipping the mixture to a foam, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

5. The method of making foamed latex sponge which comprises whipping to a foam a rubber latex containing 0.5 to 10 parts of anionic surface-active agent per 100 parts of rubber of the latex, mixing with the foamed latex an aqueous slurry of uniformly dispersed discrete glass fibers having a length from 1/32 inch to 1/2 inch, said slurry containing 0.2 to 10 parts of cationic surface-active agent per 100 parts of glass fibers, the amount of said glass fibers being 1 to 20 parts per 100 parts of rubber of the latex, the amount of anionic surface-active agent in the latex being in excess of the cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

6. The method of making foamed latex sponge which comprises whipping to a foam a rubber latex containing 0.5 to 10 parts of anionic surface-active agent per 100 parts of rubber of the latex, mixing with the foamed latex an aqueous slurry of uniformly dispersed discrete glass fibers having a length from 1/32 inch to 1/2 inch, said slurry containing 0.2 to 10 parts of cationic surface-active agent and 0.1 to 10 parts of non-ionic surface-active agent per 100 parts of glass fibers, the amount of said glass fibers being 1 to 20 parts per 100 parts of rubber of the latex, the amount of anionic surface-active agent in the latex being in excess of the cationic surface-active agent in the glass fiber slurry whereby the mixture of latex and glass fiber slurry in the foam is an anionic dispersion, shaping the foam, and gelling and vulcanizing to form sponge rubber, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

7. The method of compounding a rubber latex containing 0.5 to 10 parts of anionic surface-active agent per 100 parts of rubber of the latex with glass fibers which comprises mixing with the latex an aqueous slurry of uniformly dispersed discrete glass fibers containing 0.2 to 10 parts of cationic surface-active agent per 100 parts of glass fibers, the amount of glass fibers being 1 to 20 parts per 100 parts of rubber of the latex, the amount of anionic surface-active agent in the latex being in excess of the cationic surface-active agent in the glass fiber slurry whereby there results an anionic dispersion after incorporation of the slurry of glass fibers, said anionic surface-active agent having a general formula selected from the group consisting of R—COOM, R—SO$_3$M, and R—OSO$_3$M, where M represents a radical selected from the group consisting of alkali-metal, ammonium and amine radicals, and R represents an organic radical containing at least one group having more than 8 carbon atoms, and said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts.

8. The method of compounding a rubber latex containing 0.5 to 10 parts of anionic surface-active agent per 100 parts of rubber of the latex with glass fibers which comprises mixing with the latex an aqueous slurry of uniformly dispersed discrete glass fibers containing 0.2 to 10 parts of cationic surface-active agent and 0.1 to 10 parts of non-ionic surface-active agent per 100 parts of glass fibers, the amount of glass fibers being 1 to 20 parts per 100 parts of rubber of the latex, the amount of anionic surface-active agent in the latex being in excess of the cationic surface-active agent in the glass fiber slurry whereby there results an anionic dispersion after incorporation of the slurry of glass fibers, said anionic surface-active agent having a general formula selected from the group consisting of R—COOM, R—SO$_3$M, and R—OSO$_3$M, where M represent a radical selected from the group consisting of alkali-metal, ammonium and amine radicals, and R represents an organic radical containing at least one group having more than 8 carbon atoms, said cationic surface-active agent being selected from the group consisting of (1) quaternary ammonium salts in which one of the radicals attached to the nitrogen has an organic group having at least 8 carbon atoms and (2) amines, amides and diamines having an organic group containing at least 8 carbon atoms and their acid salts, and said non-ionic surface-active agent being selected from the group consisting of (1) monoethers of polyglycols with long chain fatty alcohols, (2) monoesters of polyglycols with long chain fatty acids, (3) monoethers of polyglycols with alkylated phenols, (4) partial esters of polyhydric alcohols with long chain monocarboxylic acids, and (5) partial and complete esters of long chain monocarboxylic acids with polyglycol ethers of polyhydric alcohols.

References Cited in the file of this patent

UNITED STATES PATENTS

| | | |
|---|---|---|
| 2,261,439 | Kelly | Nov. 4, 1941 |
| 2,321,111 | Stamberger | June 8, 1943 |
| 2,419,512 | Vesce | Apr. 22, 1947 |
| 2,444,869 | Clayton et al. | July 6, 1948 |
| 2,498,785 | Bennett et al. | Feb. 28, 1950 |

FOREIGN PATENTS

| | | |
|---|---|---|
| 500,340 | Canada | Mar. 2, 1954 |

OTHER REFERENCES

Blow: Jour. Soc. Chem. Ind. (Transactions), 1938, volume 57, pages 116–124.

Bennett: Concise Chemical and Technical Dictionary, page 275.